United States Patent [19]
Sasaki et al.

[11] Patent Number: 5,695,635
[45] Date of Patent: Dec. 9, 1997

[54] OZONE PURIFYING APPARATUS

[75] Inventors: Toshihiko Sasaki; Hatsuo Yotsumoto, both of Tokyo, Japan

[73] Assignee: Mitsubishi Denki Kabushiki Kaisha, Tokyo, Japan

[21] Appl. No.: 774,896

[22] Filed: Dec. 27, 1996

Related U.S. Application Data

[63] Continuation of Ser. No. 554,810, Nov. 7, 1995, abandoned.

[30] Foreign Application Priority Data

Jul. 5, 1995 [JP] Japan ................. 7-169941

[51] Int. Cl.⁶ ................................................. C02F 1/78
[52] U.S. Cl. ................ 210/188; 210/192; 210/195.1; 210/202; 210/242.2; 210/169; 210/170; 210/760; 119/261; 119/623
[58] Field of Search ............................ 210/760, 202, 210/242.2, 192, 170, 747, 220, 188, 242.4, 169, 195.1; 119/261, 623

[56] References Cited

U.S. PATENT DOCUMENTS

| | | | |
|---|---|---|---|
| 2,137,397 | 11/1938 | Haldeman | 210/169 |
| 3,470,091 | 9/1969 | Budd et al. | 210/242.2 |
| 3,505,213 | 4/1970 | Anthony et al. | 210/170 |
| 3,561,735 | 2/1971 | Smith | 210/192 |
| 3,653,641 | 4/1972 | Eron | 210/242.2 |
| 3,692,180 | 9/1972 | La Raus | 210/192 |
| 3,726,404 | 4/1973 | Troglione | 210/192 |
| 3,795,225 | 3/1974 | Ogui | 119/5 |
| 4,019,986 | 4/1977 | Burris et al. | 210/192 |
| 4,052,960 | 10/1977 | Birkbeck et al. | 210/169 |
| 4,128,477 | 12/1978 | Nebolsine | 210/170 |
| 4,156,401 | 5/1979 | Ogui | 210/169 |
| 4,182,267 | 1/1980 | Kominami et al. | 119/3 |
| 4,268,398 | 5/1981 | Shuck et al. | 210/242.2 |
| 4,559,902 | 12/1985 | Mason et al. | 119/2 |
| 4,565,627 | 1/1986 | Lagstrom et al. | 210/242.4 |
| 4,582,609 | 4/1986 | Hunter, III et al. | 210/170 |
| 4,587,064 | 5/1986 | Blum | 261/37 |
| 4,640,783 | 2/1987 | Kern | 210/192 |
| 4,657,675 | 4/1987 | Zan | 210/170 |
| 4,680,148 | 7/1987 | Arbisi et al. | 210/242.2 |
| 4,834,872 | 5/1989 | Overath | 210/221.2 |
| 4,906,358 | 3/1990 | Sasaki et al. | 210/167 |
| 4,906,359 | 3/1990 | Cox, Jr. | 210/170 |
| 4,944,872 | 7/1990 | Kantor | 210/170 |
| 5,071,550 | 12/1991 | Bernhardt | 210/242.2 |
| 5,076,209 | 12/1991 | Kobayashi et al. | 119/3 |
| 5,139,659 | 8/1992 | Scott | 210/169 |
| 5,330,639 | 7/1994 | Murphee | 210/170 |
| 5,336,399 | 8/1994 | Kajisono | 210/242.2 |
| 5,514,267 | 5/1996 | Machiya et al. | 210/242.2 |

FOREIGN PATENT DOCUMENTS 3216130  9/1991  Japan.

*Primary Examiner*—Cynthia L. Nessler
*Attorney, Agent, or Firm*—Rothwell, Figg, Ernst & Kurz

[57] ABSTRACT

An ozone purifying apparatus comprises a float which is afloat in polluted water and which includes an ozone reaction region in which the polluted water is mixed with ozonide air for the purpose of carrying out an ozone processing on the polluted water and an oxidant removing region in which oxidant generated due to a reaction between the polluted water and the ozonide air in the ozone reaction region is removed. The ozone purifying apparatus does not occupy a wide space. Water levels in the float can be easily adjusted. Furthermore, the ozone purifying apparatus can be easily installed.

6 Claims, 5 Drawing Sheets

OZONE PURIFYING APPARATUS

This is a continuation of application Ser. No. 08/554,810, filed Nov. 7, 1995, now abandoned.

BACKGROUND OF THE INVENTION

1. Field of the Invention

The present invention relates to an ozone purifying apparatus for improving the water quality of sea water, lake water, swamp water, or the like, by means of ozone.

2. Description of the Prior Art

Such an ozone purifying apparatus utilizing a bactericidal action, a decoloring action, and an ammonia decomposition action has been used to improve the water quality of sea water or the like. FIG. 5 shows a side view, partially in section, of a prior art and common ozone purifying apparatus for purifying sea water in a sea water bath. In the figure, reference numeral 1 denotes a sea water bath for containing sea water, in which saltwater living things are raised, for example, 2 denotes an amount of polluted sea water in the sea water bath 1, which includes excrement of living things raised within the sea water bath, and the like which are the cause of contamination in the sea water, 3 denotes a line for discharging the polluted sea water 2 out of the sea water bath 1, 4 denotes a pump for circulating the polluted sea water 2, 5 denotes a line for circulating the polluted sea water 2, and 6 denotes an ozone reaction bath which serves as an ozone reaction region in which the polluted sea water 2 and ozonide air are mixed and then an ozone processing is carried out. One end of the line 3 is open at the lower portion of the sea water bath 1 and the other end of the line 3 is connected with the inlet of the pump 4. One end of the line 5 is connected with the outlet of the pump 4, and the other end of the line 5 is open at the upper portion of the ozone reaction bath 6.

Furthermore, reference numeral 7 denotes a diffusing tube for diffusing ozonide air into the ozone reaction bath 6, 8 denotes a line for feeding ozonide air into the diffusing tube 7, 9 denotes an ozone generator for generating ozonide air to supply the ozonide air to the diffusing tube 7 by way of the line 8, and 10 denotes an air feeder for feeding air, which is a raw material for generating ozone, into the ozone generator 9. To obtain air suitable for a raw material for generating ozonide air, the air feeder 10 subjects outside air to a dehumidifying process, a compressing process, and so on. Additionally, reference numeral 11 denotes a control power supply for supplying power to control the operation of the ozone generator 9, 12 denotes a line for circulating the sea water, 13 denotes a catalyst bath which contains a catalyst such as an activated carbon or the like and which serves as an oxidant removing region for removing oxidant generated by the reaction between ozone and the polluted sea water 2 within the ozone reaction bath 6, 14 denotes a catalyst for removing oxidant from the circulated sea water, 15 denotes a plate member including openings through which the sea water is passed and which prevent the catalyst 14 from leaking from the bath 13, 16 denotes purified sea water stored in the bottom portion of the catalyst bath 13 separated from the catalyst 14 by the plate member 15, and 17 denotes a line for circulating the purified sea water. The line 12 connects the lower portion of the ozone reaction bath 6 with the upper portion of the catalyst bath 13 and the line 17 connects the bottom portion of the catalyst bath 6 with the upper portion of the sea water bath 1. Reference character h1 denotes the water level of the sea water in the ozone reaction bath 6, h2 denotes the water level of the sea water in the catalyst bath 13, and h3 denotes the water level of the polluted sea water 2 in the sea water bath 1.

Next, the description will be directed to the operation of the prior art ozone purifying apparatus. The polluted sea water 2 is sucked out of the sea water bath 1 through the line 3 by the pump 4 and is then supplied to the ozone reaction bath 6 by way of the line 5. On the other hand, the ozone generator 9 receives air as a raw material for generating ozone from the air feeder 10 and then feeds the ozonide air into the ozone reaction bath 6 through the line 8 by means of the diffusing tube 7 while it is controlled by the control power supply 11. The ozonide air is diffused into the polluted sea water 2, which is pumped into the ozone reaction bath 6, by way of the diffusing tube 6 and then forms a number of small bubbles which will come into contact with the polluted sea water 2 and then will be mixed into the sea water. Thus, the polluted sea water 2 is subjected to ozone processes such as a bactericidal process, a decoloring process, and an ammonia decomposition process, with the result that the polluted sea water 2 is purified. The ozone-treated sea water is supplied to the upper portion of the catalyst bath 13 from the lower portion of the ozone reaction bath 6 by way of the line 12 due to the difference between the water level h1 of the sea water in the ozone reaction bath 6 and the water level h2 of the sea water in the catalyst bath 13. The arrows in FIG. 5 indicate the flow of the sea water.

The oxidant component of the ozone-treated sea water, which has been generated during the ozone processes and fed into the upper portion of the catalyst bath 13, comes into contact with the catalyst 14 disposed in the catalyst bath 13 and is therefore decomposed. In this manner, an ozone bactericidal processing, a decoloring processing, and an ammonia decomposition processing are carried out, and the purified sea water 16 free of the oxidant component, which has been generated during these ozone processes, flows down freely due to the difference between the water level h2 of the sea water in the catalyst bath 13 and the water level h3 of the sea water in the sea water bath 1 and is then returned to the sea water bath 1. Thus, the polluted sea water 2 within the sea water bath 1 is purified and hence the water quality suitable for the raising of saltwater living things is maintained.

However, the prior art ozone purifying apparatus having the structure mentioned above suffers from a problem that it needs a wide space for the ozone reaction bath 6 and catalyst bath 13 which must be disposed in addition to the sea bath 1.

Another problem is that the prior art apparatus cannot provide good operability and general versatility since both the water level h1 of the sea water in the ozone reaction bath 6 and the water level h2 of the sea water in the catalyst bath 13 must be reset in accordance with the water level h3 of the sea water in the sea water bath 1 if the water level h3 changes.

Still another problem is that the installation of the prior art apparatus requires time since the lines 3, 5, 12, and 17 respectively connected between the sea water bath 1 and the pump 4, between the pump 4 and the ozone reaction bath 6, between the ozone reaction bath 6 and the catalyst bath 13, and between the catalyst bath 13 and the sea water bath 1 must be arranged on a site where such the apparatus is installed.

SUMMARY OF THE INVENTION

It is therefore an object of the present invention to provide an ozone purifying apparatus which does not need a space greater than a zone including polluted water and which is able to automatically set a certain difference between the water level of the polluted water and the water level of water in an oxidant removing region, in which oxidant is removed from the polluted water ozone-treated in an ozone reaction region, regardless of the water level of the polluted water, thereby eliminating complicated installation works such as a tubing work and the like at a site where the apparatus is installed.

It is another object of the present invention to provide an ozone purifying apparatus which is able to wash a catalyst located in the oxidant removing region in order to keep the catalyst clean at all times and which prevents contamination washed away from the catalyst from flowing into the polluted water which is the target of the ozone purifying processing.

It is a further object of the present invention to provide an ozone purifying apparatus which improves the efficiency of removing oxidant from the ozone-treated water.

It is another object of the present invention to provide an ozone purifying apparatus capable of circulating polluted water without the use of a pump for circulating the polluted water.

It is a further object of the present invention to provide an ozone purifying apparatus capable of increasing the amount of air bubbles in the ozone reaction region, thereby improving the efficiency of removing contamination from the polluted water by means of the foam fractionation.

It is another object of the present invention to provide an ozone purifying apparatus comprising a float, the structure of which can be simplified, the physical size of which can be reduced, and the cost of which can be reduced.

It is a further object of the present invention to provide an ozone purifying apparatus capable of increasing the amount of polluted water to be purified circulating through the float.

In accordance with the present invention, there is provided an ozone purifying apparatus comprising a float which is afloat in polluted water and which includes an ozone reaction region in which the polluted water is mixed with ozonide air for the purpose of carrying out ozone processing on the polluted water and an oxidant removing region in which oxidant generated by a reaction between the polluted water and the ozonide air in the ozone reaction region is removed.

The float including the ozone reaction region and oxidant removing region itself occupies less than a zone including polluted water. The height of the float above the water surface of the polluted water is uniquely determined on the basis of the weight of the float and the specific gravity of the polluted water. Therefore, a certain difference between the water level of the polluted water and the water level of water in the oxidant removing region automatically occurs regardless of the water level of the polluted water. Since lines or tubes connected between the regions are constructed when the ozone reaction region and oxidant removing region are arranged in the float and hence the installation of the float at a site, where the apparatus is installed, is completed by only setting the float afloat in the polluted water, complicated installation works such as the tubing work and the like at the site can be eliminated.

The ozone purifying apparatus further comprises a pump disposed within the float for pumping the polluted water. The weight of the float is determined in such a manner that the water level of water in the ozone reaction region is higher than that of the polluted water. The polluted water is sucked into the float by the pump. Since the water level of the water in the oxidant removing region, which depends on the determined weight of the float, is set to be higher than that of the polluted water by a predetermined height, the ozone-treated water falls freely in the oxidant removing region.

In accordance with a preferred embodiment of the present invention, the ozone purifying apparatus further comprises a first selecting device for selecting either a first path of the polluted water sucked by the pump along which it moves to the oxidant removing region and flows in a first direction within the oxidant removing region or a second path of the polluted water sucked by the pump along which moves to the oxidant removing region and flows in a second direction opposite to the first direction within the oxidant removing region, a discharging device, when the first selecting device selects the second path, for preventing the polluted water which has flown in the second direction from flowing into the ozone reaction region and for discharging the polluted water into a drain, and a second selecting device for selecting the destination of water, from which oxidant has been removed within the oxidant removing region, from either the polluted water to be pumped or the drain. The apparatus is adapted to control the first selecting device so as to feed the polluted water including no oxidant into the oxidant removing region for the purpose of washing the oxidant removing region. The discharging device discharges the polluted water which has been used for the cleaning process into the drain while preventing the water from flowing into the ozone reaction region. Furthermore, the apparatus controls the second selecting device so as to wash away and discharge contamination deposited in the oxidant removing region into the drain, not into the polluted water which is the target of the purification processing.

Preferably, the ozone purifying apparatus further comprises a gas-liquid separating device for separating ozone-treated water including ozonide air passing through the ozone reaction region in the float into a gas component and a liquid component, and a collecting device disposed in the separating device for collecting air and polluted air bubbles separated from the ozone-treated water by the separating device. Therefore, since only purified water flows into the oxidant removing region, the efficiency of removing oxidant from the ozone-treated water can be improved.

In accordance with a preferred embodiment of the present invention, the ozone purifying apparatus further comprises an air bubble generating device for generating air bubbles, an ozone bubble generating device for generating ozone bubbles, or both of them, disposed in a lower portion of the ozone reaction region. Air bubbles, ozone bubbles, or both of them are diffused into the ozone reaction region. Due to the air lift force caused by these bubbles, the polluted water flows into the ozone reaction region by way of openings arranged in the bottom wall of the ozone reaction region. Therefore, since the apparatus does not need a pump for circulating the polluted water, the structure of the float can be simplified. Furthermore, since the apparatus increases the amount of the bubbles in the ozone reaction region, the efficiency of removing contamination from the polluted water by means of the foam fractionation can be improved.

Preferably, the float includes only an air diffusing tube among components which construct the air bubble generating device. Alternatively, the float includes only an ozone diffusing tube among components which construct the ozone bubble generating device. Alternatively, the float may comprise both the air diffusing tube and the ozone diffusing tube. In either case, the apparatus does not need a mechanical machine room located in the float for accommodating a pump for supplying air or ozone, and so on. Therefore, the structure of the float can be simplified, the physical size the float can be reduced, and the cost of manufacturing the float can be reduced. Furthermore, since the cross-sectional area of the oxidant removing region in the float can be increased, the amount of the sea water to be purified circulating in the float can be increased.

Further objects and advantages of the present invention will be apparent from the following description of the preferred embodiments of the invention as illustrated in the accompanying drawings.

DETAILED DESCRIPTION OF THE PREFERRED EMBODIMENTS

Figure 1:
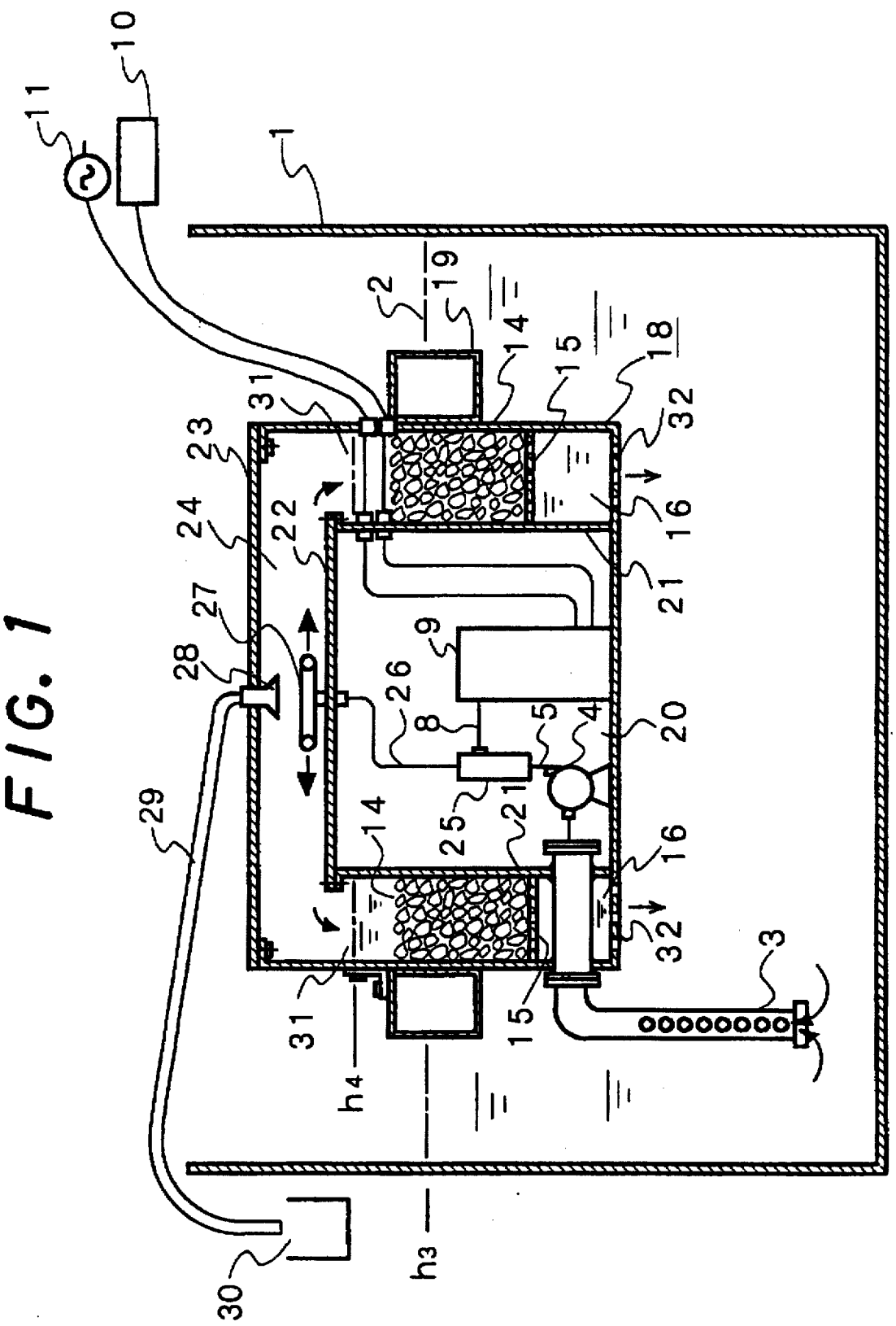
FIG. 1 is a side view, partially in section, showing the structure of an ozone purifying apparatus according to a first embodiment of the present invention.

Turning next to the drawing figures in which the same reference characters as in the figure of the prior art ozone purifying apparatus indicate identical or like elements, several alternate embodiments will now be described. In the following preferred embodiments, the description about the same elements as in the prior art apparatus and other embodiments which will be explained in advance will be omitted.

Referring now to FIG. 1, it illustrates a side view, partially in section, showing the structure of an ozone purifying apparatus according to a first embodiment of the present invention. In the figure, reference numeral 18 denotes a float which is afloat in polluted sea water 2 contained within the sea water bath 1, and 19 denotes a water-level balancer mounted on a lateral surface of the float 18 for determining the height of the float 18 above the water surface of the polluted sea water 2. The height of the float 18 above the water surface of the polluted sea water 2 is uniquely determined on the basis of the weight of the float 18 and the specific gravity of the polluted sea water 2. Furthermore, reference numeral 20 denotes a mechanical machine room in which a pump 4, an ozone generator 9, and an ozone injecting and mixing unit which will be explained later, 21 denotes a shield plate which constructs a side wall of the mechanical machine room 20 and which shields the mechanical machine room 20 from an oxidant removing region, 22 denotes a detachable/attachable shield lid for sealing the mechanical machine room 20, 23 denotes a detachable/attachable shield lid disposed at the upper portion of the float 18, and 24 denotes a gas-liquid separator disposed as a sealed space between the shield lids 23 and 22 for separating a gas component from a liquid component.

Reference numeral 25 denotes an ejector disposed as an ozone reaction region in which small bubbles of ozonide air are mixed into the polluted sea water, and 26 denotes a line for feeding the ozone-treated sea water discharged out of the ejector 25 into the gas-liquid separator 24. The air inlet of the ejector 25 is connected to a line 8 for feeding the ozonide air, the water inlet of the ejector 25 is connected to a line 5 for feeding the polluted sea water 2, and the water outlet of the ejector 25 is connected to a line 26 for feeding the ozone-treated sea water. Furthermore, reference numeral 27 denotes a diffusing tube mounted on the shield lid 22 for diffusing the ozone-treated and circulated sea water radially within the gas-liquid separator 24. The water inlet of the diffusing tube 27 is connected to the line 26 and the diffusing tube 27 is open in the separator 24. Reference numeral 28 denotes a wrapper tube disposed in the shield lid 23 for collecting air separated from the sea water in the gas-liquid separator 24 and polluted bubbles formed and separated from the sea water. The wrapper tube 28 is open in the separator 24. Additionally, reference numeral 29 denotes a line for feeding the air and polluted bubbles sucked through the wrapper tube 28, 30 denotes a drain pit connected to the line 29 for discharging the air and polluted bubbles, or polluted water including liquefied polluted bubbles, which is fed through the line 29, 31 denotes a catalyst bath which is formed as the oxidant removing region within the float 18 and which surrounds the mechanical machine room 20, 32 denotes a plate member, which is a part of the bottom plate of the float 18, having openings through which purified sea water 16 flows into the sea water bath 1, and h4 denotes the water level of the sea water in the catalyst bath 31.

Next, the description will be directed to the operation of the ozone purifying apparatus of this embodiment. The pump 4 located in the mechanical machine room 20 supplies the polluted sea water 20 stored in the sea water bath to the ejector 25 by way of the lines 3 and 5. Ozonide air generated by the ozone generator 9 is sucked into the ejector 25 in the form of small bubbles and is then mixed with the polluted sea water 2 for carrying out the ozone processing. The sea water ozone-treated in the ejector 25 is fed into the diffusing tube 27 by way of the line 26 and is then diffused within the gas-liquid separator 24 by the diffusing tube 27. The gas-liquid separator 24 separates a gas component from the ozone-treated sea water including small bubbles of ozonide air. Air and polluted bubbles separated from the ozone-treated sea water are collected by the wrapper tube 28 and are then discharged into the drain pit 30 by way of the line 29. On the other hand, the liquid component of the ozone-treated sea water separated by the gas-liquid separator is fed into the catalyst bath 31 surrounding the mechanical machine room 20.

The difference between the water level h4 of the sea water in the catalyst bath 31 and the water level h3 of the sea water in the sea water bath 1 is adjusted by the water level balancer 19 so that the ozone-treated sea water falls freely in the catalyst bath 31. The ozone-treated sea water flows down within the catalyst bath 31 due to the pressure resulting from the water level difference (h4–h3), and then it comes into contact with the catalyst 14. Therefore, an oxidant component which has been produced during the preceding ozone treatment is removed from the ozone-treated sea water flowing down within the catalyst bath 31. As a result, the polluted sea water is purified, and the purified sea water 16 is further discharged into the sea water bath 1 through the openings in the plate member 32 disposed in the outer portion of the bottom of the float 18.

Figure 2:
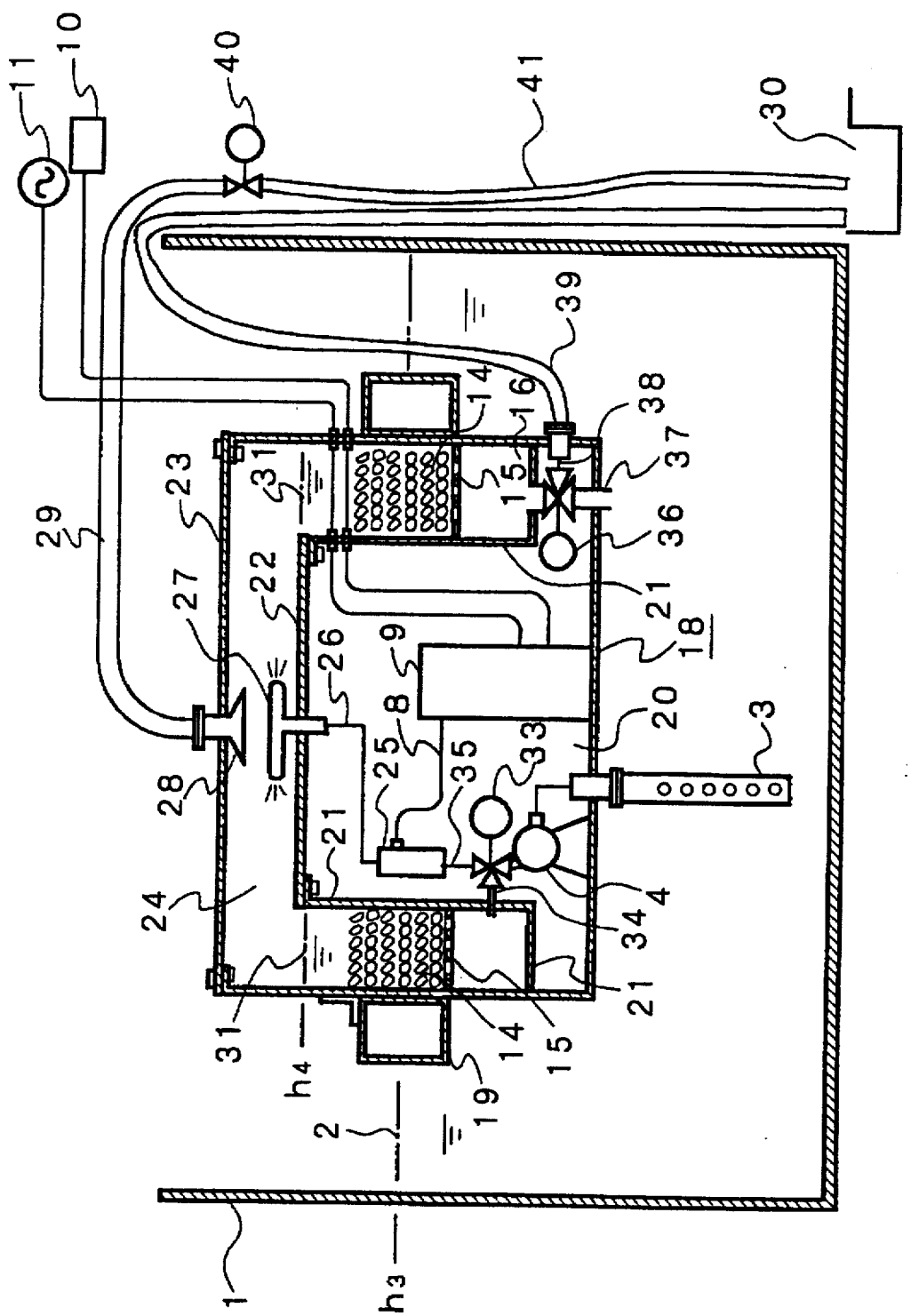
FIG. 2 is a side view, partially in section, showing the structure of an ozone purifying apparatus according to a second embodiment of the present invention.

Referring now to FIG. 2, it illustrates a side view, partially in section, showing the structure of an ozone purified apparatus according to a second embodiment of the present invention. In the figure, reference numeral 33 denotes a three-way valve disposed as a first selecting device for selecting the destination of the polluted sea water 2 discharged out of the pump 4 from either the ejector 25 or the catalyst bath 31, 34 denotes a line which connects the three-way valve 33 with the bottom portion of the catalyst bath 31, 35 denotes a line which connects the three-way valve 33 with the ejector 25, 36 denotes a three-way valve disposed as a second selecting device for selecting the destination of the sea water in the bottom of the catalyst bath 31 to either the drain pit 30 or the sea water bath 1, 37 denotes a line which connects the three-way valve 36 with the sea water bath 1 and which is open to the sea water bath 1, 38 denotes a line which connects the three-way valve 36 with the drain pit 30, 39 denotes a line which is connected with the line 38 and which is open to the drain pit 30, 40 denotes a two-way valve for opening or closing a passage which connects the wrapper tube 28 with the drain pit 30, and 41 denotes a line which is connected with the two-way valve 40 and which is open to the drain pit 30. In this embodiment, when the sea water is fed in the reverse direction within the catalyst bath 31 in order to purify the catalyst 14, the wrapper 28 serves as a discharging device to discharge the polluted sea water 2 which has flowed in the reverse direction within the catalyst bath 31 into the drain pit 30.

Next, the description will be directed to the operation of the ozone purifying apparatus of this embodiment. In the first embodiment, the polluted sea water 2 is sucked into the float 18 by the pump 4 and is then circulated through the ejector 25, diffusing tube 27, and catalyst bath 31 in only one direction, whereas in the second embodiment the sea water can be circulated in the reverse direction as well as in the same direction as in the first embodiment in order to purify the catalyst 14.

When the ozone processing is carried out for the polluted sea water 2, the three-way valve 33 is controlled so as to connect the outlet of the pump 4 with the line 35, and the three-way valve 36 is controlled so as to connect the bottom of the catalyst bath 31 with the line 37. Furthermore, the two-way valve 40 is opened. Thus, the circulating passage of the sea water similar to that in the first embodiment is formed and the ion purification processing is carried out for the polluted sea water 2 in the same manner as in the first embodiment.

When washing away oxidant deposited on the catalyst 14 by circulating the sea water in the direction opposite to that in the ion purification processing mentioned above, the three-way valve 33 is controlled so as to connect the outlet of the pump 4 with the line 34, and the three-way valve 36 is closed so as to prevent the sea water from flowing into the bottom of the catalyst bath 31. Furthermore, the two-way valve 40 is opened. Thus, the polluted sea water 2 is sucked out by the pump 4 and then flows upward, i.e., in the reverse direction from the lower portion to the upper portion within the catalyst bath 31. Furthermore, the sea water flows through the gas-liquid separator 24, wrapper tube 28, line 29, two-way valve 40, and line 41. Finally, the polluted sea water 2 is discharged into the drain pit 30. Thus, oxidant deposited on the catalyst 14 can be washed away by means of the polluted sea water 2 free of oxidant.

Furthermore, the apparatus provides another washing process in which the sea water is circulated in the same direction as in the aforementioned ozone purification processing for the polluted sea water in order to wash away contamination which was deposited on the catalyst 14 at the beginning of the use of it and contamination which has been carried by the polluted sea water during the aforementioned washing process in which the sea water is circulated in the reverse direction and then deposited on the catalyst 14. In the other washing process, the three-way valve 33 is controlled so as to connect the outlet of the pump 4 with the line 35, and the three-way valve 36 is controlled so as to connect the bottom of the catalyst bath 31 with the line 38. Furthermore, the two-way valve 40 is closed. Then, the polluted sea water 2 is sucked into the float 18 by the pump 4, and then it passes through the elector 25 and diffusing tube 27 and falls freely within the catalyst bath 31. Thus, contamination washed away from the catalyst 14 is discharged into the drain pit 30 by way of the lines 38 and 39, not into the sea water bath 1, because the three-way valve 36 is controlled so as to connect the bottom of the catalyst bath 31 with the line 38.

As mentioned above, the ozone purifying apparatus according to this embodiment of the present invention makes it possible to keep the catalyst 14 clean by washing the catalyst 14 when necessary, e.g., when the catalyst 14 becomes polluted with the contamination mentioned above, and purify the polluted sea water 2 while preventing the contamination washed away from the catalyst 31 from flowing into the sea water bath 1.

Figure 3:
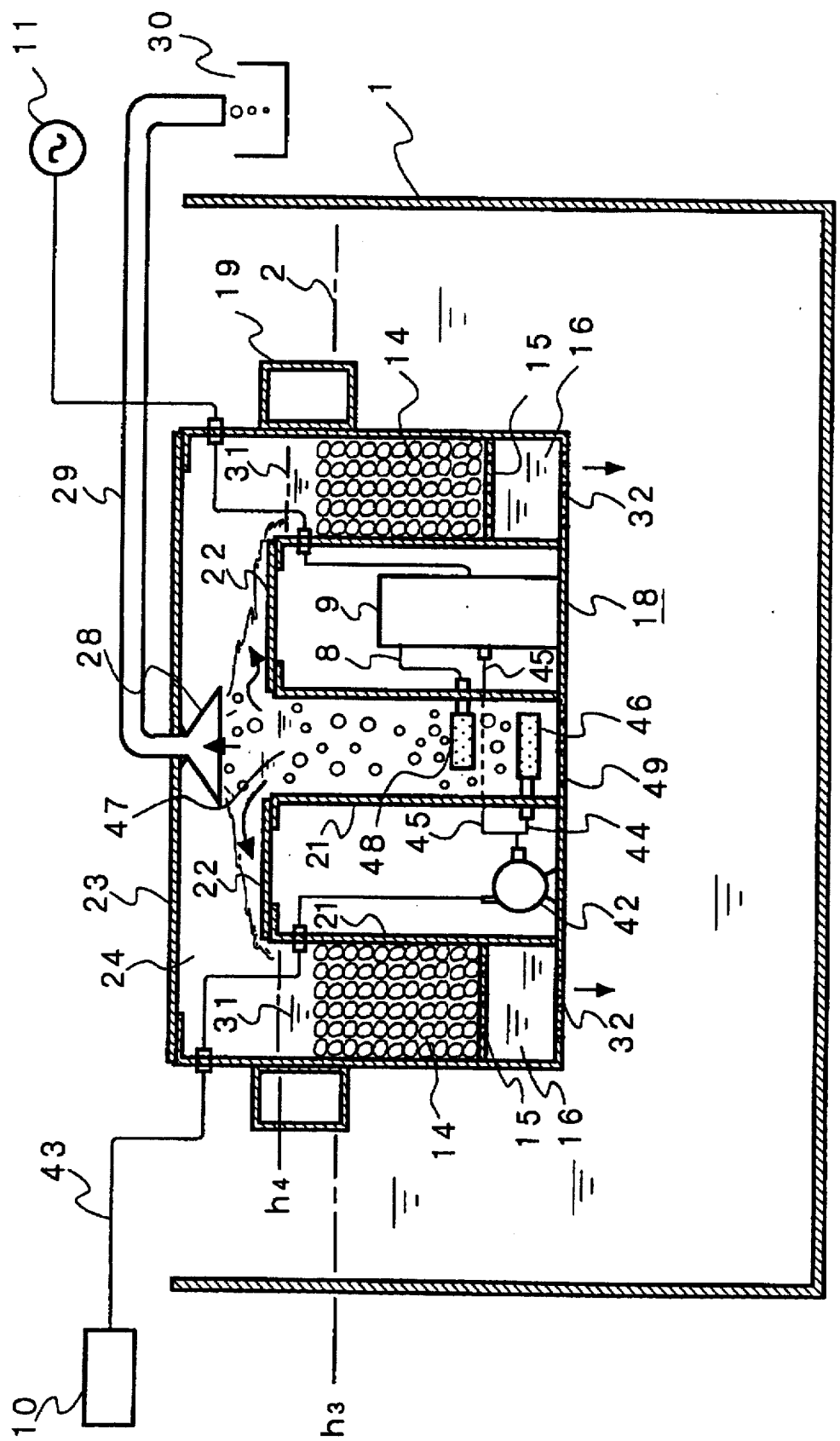
FIG. 3 is a side view, partially in section, showing the structure of an ozone purifying apparatus according to a third embodiment of the present invention.

Referring now to FIG. 3, it illustrates a side view, partially in section, showing the structure of an ozone purified apparatus according to a third embodiment of the present invention. In the figure, reference numeral 42 denotes an air pump which constructs a part of an air bubble generating device which sucks outside air to diffuse air bubbles within an ozone reaction bath, 43 denotes a line which connects the air feeder 10 with the air pump 42, 44 denotes a line connected with the air outlet of the air pump 42, 45 denotes a line which connects the air outlet of the air pump 42 with the air inlet of the ozone generator 9, 46 denotes an air diffusing tube, which is a part of the air bubble generating device, connected with the line 44, and 47 denotes the ozone reaction bath disposed as an ozone reaction region in which the polluted sea water is mixed with ozonide air for the ozone processing. The air diffusing tube 46 is located in the lower portion of the ozone reaction bath 47. Furthermore, reference numeral 48 denotes an ozone diffusing tube, which is a part of an ozone bubble generating device, which is located above the air diffusing tube 46 in the lower portion of the ozone reaction bath 47 and connected with the ozone generator 9 by way of the line 8, and 49 denotes a number of openings, through which the polluted sea water can flow into the ozone reaction bath 47, arranged in a part of the bottom wall of the float 18, which corresponds to the bottom of the ozone reaction bath 47. The ozone generator 9 constructs a part of the ozone bubble generating device.

Next, the description will be directed to the operation of the ozone purifying apparatus of this embodiment. In accordance with this embodiment, air sucked as a raw material for generating ozonide air by the air feeder 10 is supplied to the air pump 42 by way of the line 43. After the air is pressurized by the air pump 42, it is divided and supplied to both the air diffusing tube 46 and the ozone generator 9 by way of the lines 44 and 45. Thus, small air and ozone bubbles are sent out into the ozone reaction bath 47 and then the polluted sea water 2 flows into the ozone reaction bath 47 by way of the plural openings 49 due to the air lift force caused by the air and ozone bubbles. As a result, an upward-moving stream takes place. The polluted sea water 2 is mixed with the diffused ozone bubbles during their upward movement in the ozone reaction bath 7. Thus, the polluted sea water 2 is ozone-treated. In accordance with this embodiment, since no pump is used for sucking the polluted sea water 2, the structure of the float 18 can be simplified. Furthermore, since the amount of air bubbles generated by the air diffusing tube 46 can be increased, the efficiency of removing contamination from the polluted sea water by means of the foam fractionation can be improved.

Figure 4:
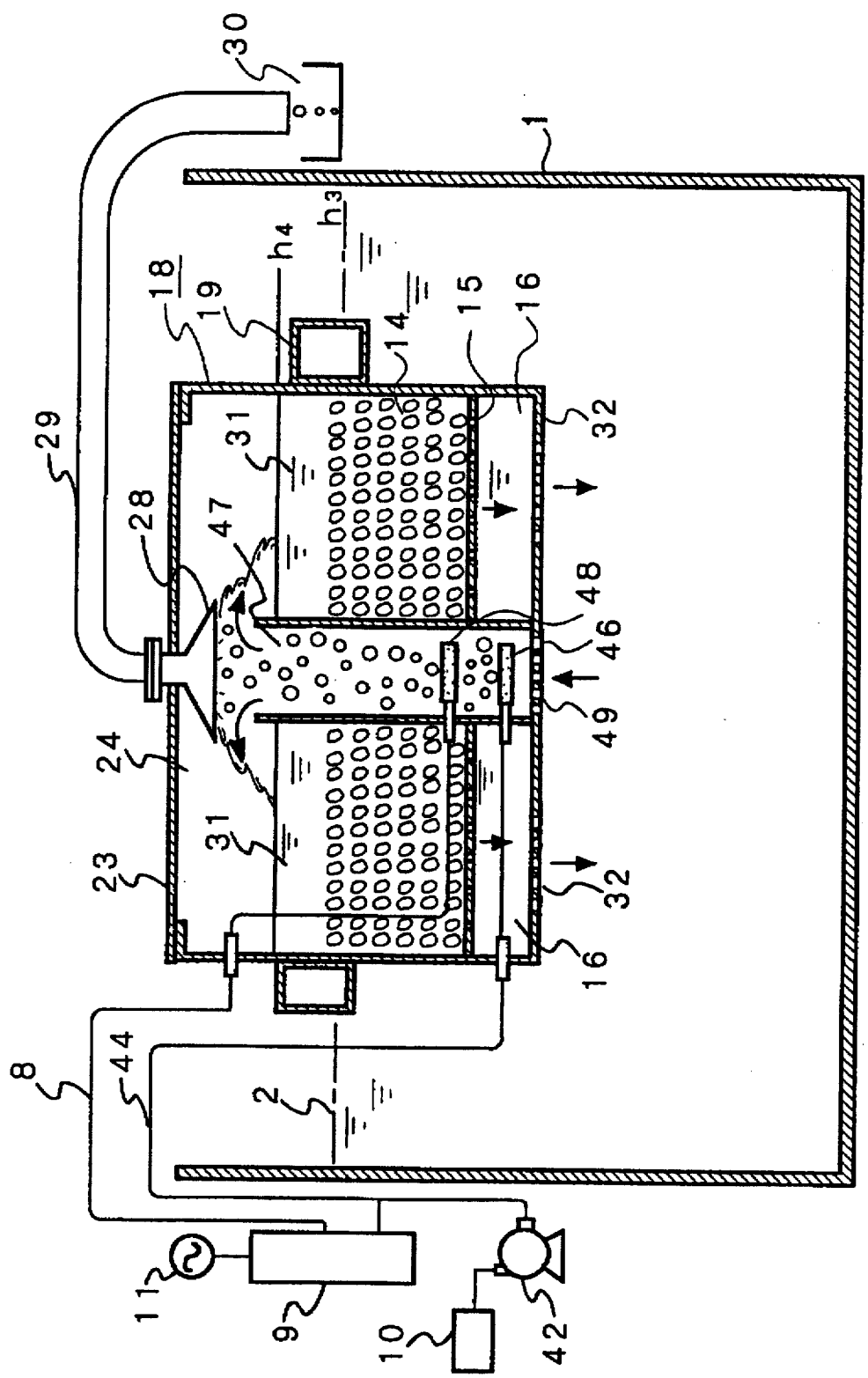
FIG. 4 is a side view, partially in section, showing the structure of an ozone purifying apparatus according to a fourth embodiment of the present invention.
Figure 5:
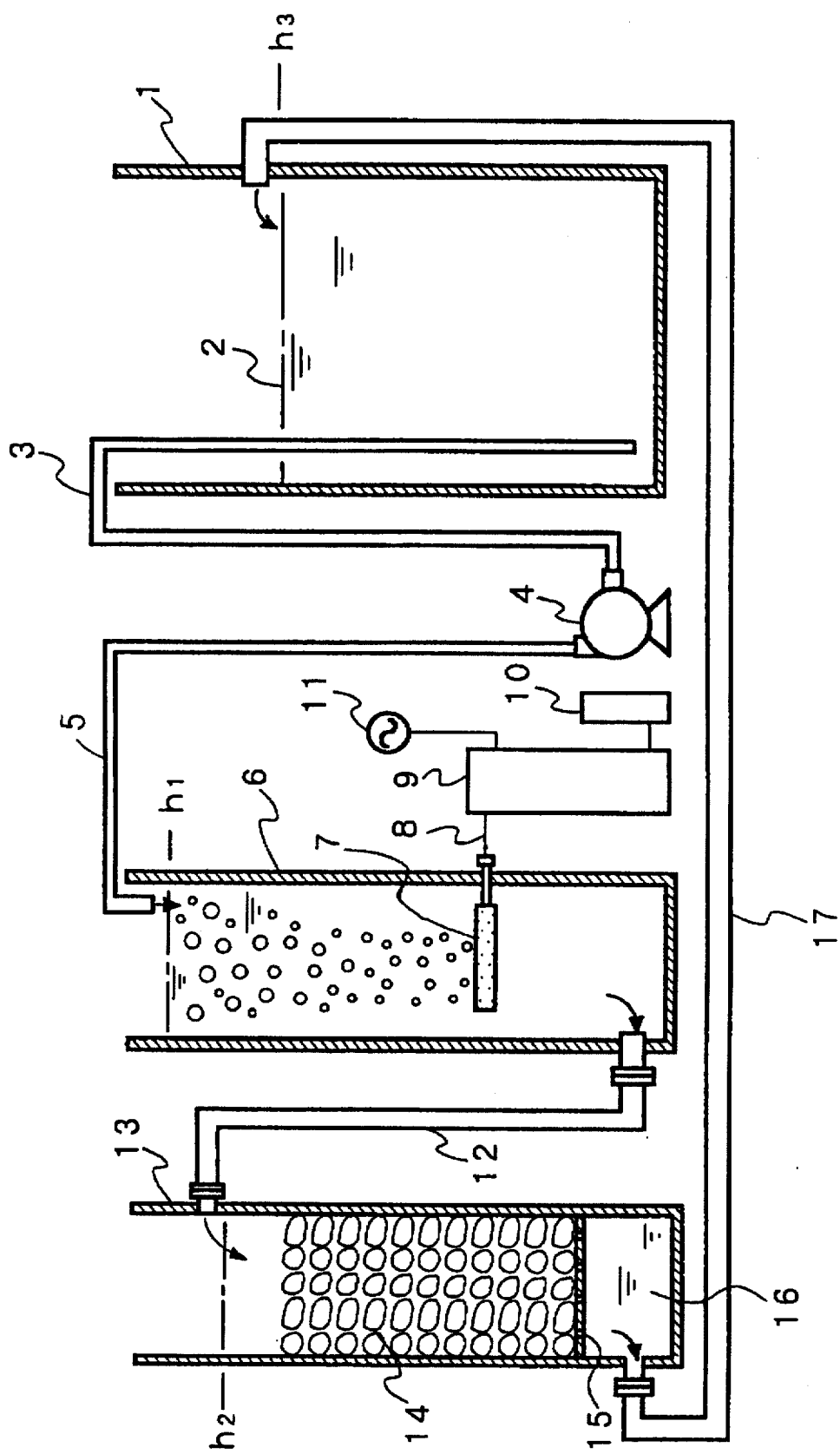
FIG. 5 is a side view, partially in section, showing the structure of a prior art ozone purifying apparatus.

Referring now to FIG. 4, it illustrates a side view, partially in section, of an ozone purified apparatus according to a fourth embodiment of the present invention. In accordance with this embodiment, the air pump 42 and ozone generator 9 are located outside the sea water bath 1, i.e., outside the float 18. Therefore, since there is no need to arrange a mechanical machine room in the float 18, the structure of the float 18 can be simplified, the physical size of the float can be reduced, and the cost of manufacturing the float can be reduced. Furthermore, since the cross-sectional area of the catalyst bath 31 can be increased, the amount of the sea water to be purified circulating in the float 18 can be increased.

It will be obvious to those skilled in the art that the ozone purifying apparatus of this invention is not limited to use in the purification of the polluted sea water 2 in the sea water bath 1; it may of course be applied with equal utility to the purification of polluted water having different water quality in a lake, a swamp or the like, and to the purification of polluted water not contained in a bath.

As previously mentioned, the present invention offers the following advantages.

In accordance with a preferred embodiment of the present invention, an ozone purifying apparatus comprises a float which is afloat in polluted water and which includes an ozone reaction region in which the polluted water is mixed with ozonide air and an oxidant removing region in which oxidant generated by a reaction between the polluted water and the ozonide air in the ozone reaction region is removed. Therefore, the float including the ozone reaction region and oxidant removing region itself occupies less than a zone including polluted water. The height of the float above the water surface of the polluted water is uniquely determined on the basis of the weight of the float and the specific gravity of the polluted water. Therefore, a certain difference between the water level of the polluted water and the water level of water in the oxidant removing region automatically occurs regardless of the water level of the polluted water. Since lines or tubes connected between the regions are constructed when the ozone reaction region and oxidant removing region are arranged in the float and hence the installation of the float at a site, where the apparatus is installed, is completed by only setting the float afloat in the polluted water, complicated installation works such as the tubing work and the like at the site can be eliminated.

The polluted water is sucked into the float by a pump. Furthermore, the apparatus is so constructed that the water level of the water in the oxidant removing region, which depends on the predetermined weight of the float, is higher than that of the polluted water by a predetermined height. Therefore, the ozone-treated water falls freely in the oxidant removing region.

In accordance with a preferred embodiment of the present invention, the apparatus is adapted to control a first three-way valve so as to feed the polluted water including no oxidant into the oxidant removing region for the purpose of washing the oxidant removing region. A discharging device discharges the polluted water which has been used for the cleaning process into a drain pit while preventing the water from flowing into the ozone reaction region. Furthermore, the apparatus controls a second three-way valve so as to wash away and discharge contamination deposited in the oxidant removing region into the drain pit, not into the polluted water which is the target of the purification processing. Therefore, the ozone purifying apparatus makes it possible to wash a catalyst contained in the oxidant removing region when necessary while preventing contamination washed away from the catalyst from flowing into the polluted water which is the target of the purification processing.

The ozone purifying apparatus further comprises a gas-liquid separating device for separating ozone-treated water including ozonide air passing through the ozone reaction region in the float into a gas component and a liquid component, and a collecting device disposed in the separating device for collecting air and polluted air bubbles separated from the ozone-treated water by the separating device. Therefore, since only purified water flows into the oxidant removing region, the efficiency of removing oxidant from the ozone-treated water can be improved.

In accordance with a preferred embodiment of the present invention, the ozone purifying apparatus further comprises an air bubble generating device for generating air bubbles, an ozone bubble generating device for generating ozone bubbles, or both of them, disposed in a lower portion of the ozone reaction region. Air bubbles, ozone bubbles, or both of them are diffused into the ozone reaction region. Due to the air lift force caused by these bubbles, the polluted water flows into the ozone reaction region by way of openings arranged in the bottom wall of the ozone reaction region. Therefore, since the apparatus does not need a pump for circulating the polluted water, the structure of the float can be simplified. Furthermore, since the apparatus increases the amount of the bubbles in the ozone reaction region, the efficiency of removing contamination from the polluted water by means of the foam fractionation can be improved.

Preferably, the float includes only an air diffusing tube among components which construct the air bubble generating device. Alternatively, the float includes only an ozone diffusing tube among components which construct the ozone bubble generating device. Alternatively, the float may comprise both the air diffusing tube and the ozone diffusing tube. In either case, the apparatus does not need a mechanical machine room located in the float for accommodating a pump for supplying air or ozone, and so on. Therefore, the structure of the float can be simplified, the physical size of the float can be reduced, and the cost of manufacturing the float can be reduced. Furthermore, since the cross-sectional area of the oxidant removing region in the float can be increased, the amount of the sea water to be purified circulating in the float can be increased.

Many widely different embodiments of the present invention may be constructed without departing from the spirit and scope of the present invention. It should be understood that the present invention is not limited to the specific embodiments described in the specification, except as defined in the appended claims.

What is claimed is:

1. An ozone purifying apparatus comprising:
   a container for containing polluted water which is to be treated by said purifying apparatus;
   an enclosed housing including means for floating said housing in said polluted water within said container, said housing having at least one aperture in a bottom wall thereof;
   an ozone reaction means disposed within said housing for defining an ozone reaction region in which polluted water is mixed with ozonide air for the purpose of carrying out an ozone processing on the polluted water;

an oxidant removing means disposed within said housing and fluidly connected to said ozone reaction means for defining an oxidant removing region in which oxidant generated by a reaction between the polluted water and the ozonide air in said ozone reaction region is removed;

means for sucking said polluted water from said container into said ozone reaction means; and means for returning purified water from said oxidant removing means into said container through said at least one aperture in said bottom wall of said housing.

2. The ozone purifying apparatus according to claim 1, wherein said housing further comprises a gas-liquid separating means, fluidly connected between said ozone reaction means and said oxidant removing means, for separating ozone-treated water including ozonide air passing through the ozone reaction region in said housing into a gas component and a liquid component, and a collecting means disposed in said separating means for collecting air and polluted air bubbles separated from the ozone-treated water by said separating means.

3. The ozone purifying apparatus according to claim 1, wherein said apparatus further comprises a pump disposed within said housing for pumping the polluted water, and wherein said housing further includes means for maintaining the water level of water in said ozone reaction region at a level higher than that of the polluted water.

4. The ozone purifying apparatus according to claim 3, wherein said apparatus further comprises a first selecting means for selecting either a first path of the polluted water sucked by said pump through said ozone reaction region to said oxidant removing region, said first path flowing in a first direction within said oxidant removing region, or a second path of the polluted water sucked by said pump directly to said oxidant removing region, said second path flowing in a second direction opposite to the first direction within said oxidant removing region, said apparatus further comprising a discharging means for preventing the polluted water flowing in the second direction from flowing into the ozone reaction region and for discharging the polluted water into a drain, and a second selecting means for selecting the destination of water flowing in said first path to the polluted water to be pumped, and selecting the destination of water flowing in said second path to the drain.

5. The ozone purifying apparatus according to claim 1, wherein said apparatus further comprises an air bubble generating means for generating air bubbles, disposed in a lower portion of the ozone reaction region.

6. The ozone purifying apparatus according to claim 5, wherein said air bubble generating means includes an air diffusing tube and said ozone bubble generating means includes an ozone diffusing tube.

* * * * *